Sept. 7, 1926.  1,599,262
E. C. D. WITHELL
STEERING DEVICE FOR MOTOR TRACTORS
Filed Oct. 24, 1924
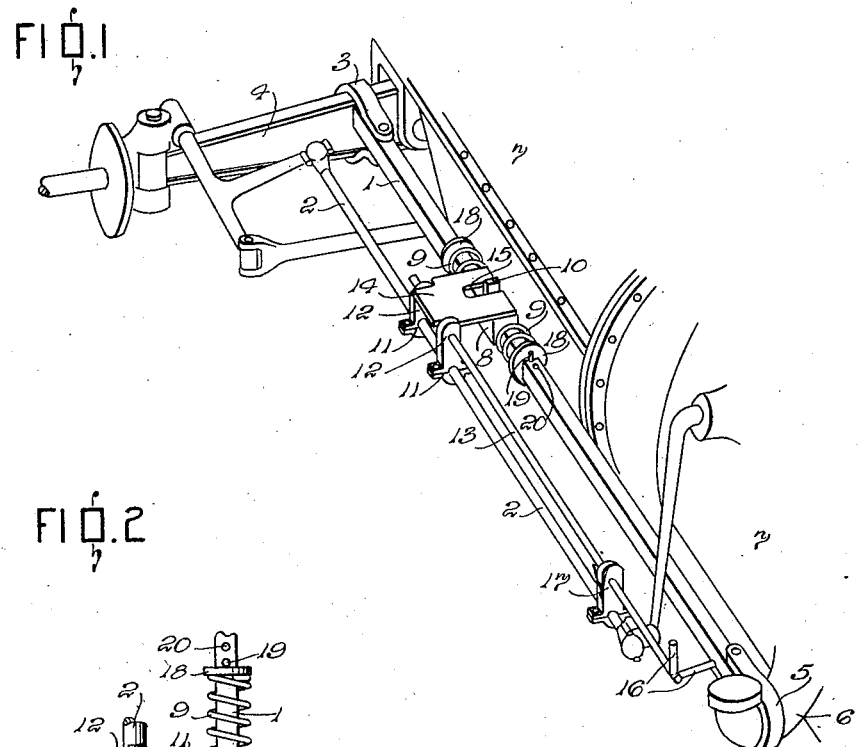
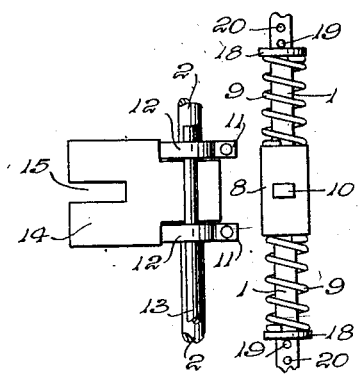
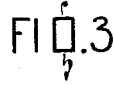
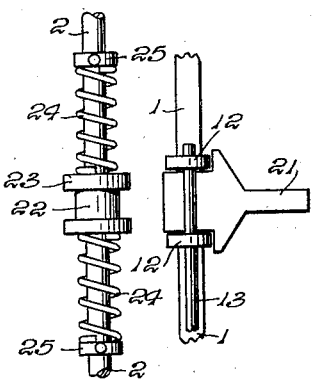
INVENTOR:
Edgar Charles Darfield Withell
BY: Francis E. Boyce
ATTORNEY Patented Sept. 7, 1926.

1,599,262

UNITED STATES PATENT OFFICE.

EDGAR CHARLES DARFIELD WITHELL, OF MAYFIELD, NEAR THE TOWNSHIP OF ASHBURTON, NEW ZEALAND.

STEERING DEVICE FOR MOTOR TRACTORS.

Application filed October 24, 1924, Serial No. 745,716, and in New Zealand July 2, 1924.

This invention relates to the steering of wheeled motor-tractors in which the front axle is of the "Ackerman" type.

Owing to the rough or uneven surface of the land over which a tractor is required to travel, more particularly when drawing agricultural implements, the front wheels are apt to be turned from side to side and consequently the driver is obliged to exercise considerable force upon the steering-wheel in order to counteract this tendency and keep the tractor upon a straight course.

It is the object of the present invention however to provide means whereby the steering-gear may, at the will of the driver, be locked in the required position to cause the tractor to proceed in a straight line, thereby saving the driver considerable fatigue and leaving him free to attend to other matters in connection with the running of the tractor or the drawn implement.

In carrying this object into effect according to the present invention there is mounted upon some fixed portion of the chassis, or understructure of the tractor, a member positioned side-by-side with the drag-link of the steering-gear, upon such drag-link and member are suitable formations, adapted by a manipulation of the driver, to be brought into engagement with each other when the drag-link is in that position in which it places the front wheels of the tractor so as to cause the same to travel in a straight line, thus causing the drag-link to be locked or retained in this position and so relieving the driver and the remainder of the steering gear of the strain, while by a further movement or manipulation by the driver the said formations may be disengaged, thus permitting the steering to be resumed in the ordinary manner.

One of the said formations is mounted to be movable in a direction parallel with the drag-link but is limited or restrained in such movement by means of a cushioning spring or springs which therefore absorb any shocks and jars which might otherwise damage the said formations or the portions of the structure by means of which such formations are carried.

In order that the nature of the invention may be clearly understood, it will now be fully described and explained with reference to the accompanying sheet of drawings, in which:—

Fig. 1 is a perspective view of a portion of a tractor showing applied thereto one embodiment of the invention here illustrated in the locked position.

Fig. 2 is a plan view of such locking device, showing the same in the unlocked or open position, and Fig. 3 is a plan view of a modified form of the construction.

In one preferred embodiment of the construction, as here illustrated, in Figs. 1 and 2, there is provided a rod 1 which is disposed side-by-side with the drag-link 2 of the tractor, such rod 1 being attached at its forward end by means of a clip 3 to the front axle 4 of the tractor, while the rear end of the rod is attached by means of a clip 5 to a filler-duct 6 or other fixed point upon the chassis or structure of the tractor 7.

Upon the said rod 1 is slidably mounted a member 8 which is limited and restrained in its sliding movement by means of a pair of cushioning springs 9 coiled upon such rod to either end of the said member 8 and adapted to act upon the latter in opposition to each other.

In this form of the construction the said rod 1 is preferably of square cross-section, as here shown, or otherwise formed to non-rotatably carry the sliding member 8, which latter is provided with an upward projection 10.

Attached to the drag-link 2, preferably by means of clips 11 adapted to embrace such link, are a pair of bearings 12, in which is rotatably mounted a shaft or spindle 13 extending parallel with the drag-link.

Rigidly attached to the said spindle 13 at a position between the said bearings 12 is a plate or member 14 which extends laterally at one side of such spindle and is formed with a slot or opening 15 adapted when such spindle is turned axially into one position, to come in line with the said projection 10 and engage such projection when the drag-link is in its said position to cause the tractor to travel in a straight line. The action of turning the spindle into another position will cause the said opening 15 to disengage the projection 10, thus releasing the drag-link and so permitting of hand steering being resumed.

As here shown, for the purpose of enabling this turning of the spindle 13 to be conveniently effected, such spindle is formed at its rear end, with one or more radial arms or cranks 16 adapted to be engaged by the foot of the driver from his seat upon the tractor. In lieu of these arms however any other suitable means may be provided to enable this turning of the spindle to be effected by the hand, foot or other portion of the driver. A third bearing 17 is also preferably provided to carry the rear end of the spindle 13, such bearing being preferably secured to the drag-link by means of a clip similar to those of the bearings 12.

The cushioning springs 9 will be so arranged as to permit of their controlled member moving just sufficiently to absorb shocks and strains, which, in the absence of such provision, might cause damage to the parts. Provision is preferably made for enabling the strengths or pressures of the springs to be adjusted. As here shown this purpose is effected by threading upon the rod 1 collars or washers 18 which receive the outer abutments of the springs and which collars or washers are retained in place by means of pins 19 which are insertable in any of a series of holes 20, formed through the rod 1 at various positions upon the length of the latter. This adjustment may however be effected by other means such for instance as by providing such collars with set-screws tapped therein and adapted to engage the rod or clamp such collars upon the rod.

The construction may however be modified in various ways. Thus for example the bearings of the shaft 13 may be carried upon the rod 1 and the engaging formation of such shaft may consist of a tongue or projection 21 engageable with a groove 22 formed in the periphery of a collar 23 slidably mounted upon the drag-link and restrained by cushioning-springs 24 coiled upon such drag-link between the ends of the collar 23 and collars 25 fixedly attached to such drag-link, all as shown in Fig. 3.

It will also be obvious that it is immaterial which of the members 8 and 14 of Fig. 1, or 21 and 23 of Fig. 3, be slidable, provided that one of either pair is slidable on its carrying member while the other is secured against such sliding movement.

In operation, while hand-steering is being effected by means of the hand-wheel or other manipulable device, the shaft 13 will be turned into the required position to place its engaging member as 15 or 21 clear of the corresponding formation as 10 or 22.

When locking of the steering is desired however the said shaft will be turned into that position in which it places its engaging member 15 or 21 within range of the corresponding formation 10 or 22 so that engagement between the latter and the formation 15 or 21 will take place when the drag-link is brought by the steering-wheel into that position in which it causes the tractor to travel in a straight line.

I claim:—

1. In a motor tractor, the combination of a front axle vertically swingable relatively to the frame of the tractor and provided with steering knuckles at opposite ends thereof, a drag link disposed at right angles to said axle and connected with one of said knuckles for directing the same, a bar secured in parallelism with said drag link, said bar and link carrying one a member slidable thereon and the other carrying a pivoted member fixed against sliding movement, said fixed member being adapted to engage the slidable member, springs for maintaining said slidable member in a central position, and means in position to be operated by the foot of the driver for swinging said pivoted member into and out of engagement with said slidable member.

2. In a motor tractor, the combination of a front axle vertically swingable relatively to the frame of the tractor and provided with steering knuckles at opposite ends thereof, a drag link disposed at right angles to said axle and connected with one of said knuckles for directing the same, a bar secured in parallelism with said drag link, a member carried by said bar and slidable longitudinally thereon, a plurality of bearing members fixedly secured on said drag link, a rod journalled in said bearings in parallel relation with the drag link, a laterally extending member secured to said rod and adapted to engage said slidable member, springs disposed one at each end of said slidable member and adapted to normally maintain said member in a central position, and laterally extending arms carried by said rod and disposed in position to be operated by the foot of the driver for swinging said rod thereby to carry said laterally extending member into and out of engagement with said slidable member.

In testimony whereof I have signed my name to this specification.

EDGAR CHARLES DARFIELD WITHELL.